March 7, 1950     J. W. BOULDIN     2,499,900
UNIVERSAL PLUMBING FITTING
Filed April 1, 1947     2 Sheets-Sheet 1
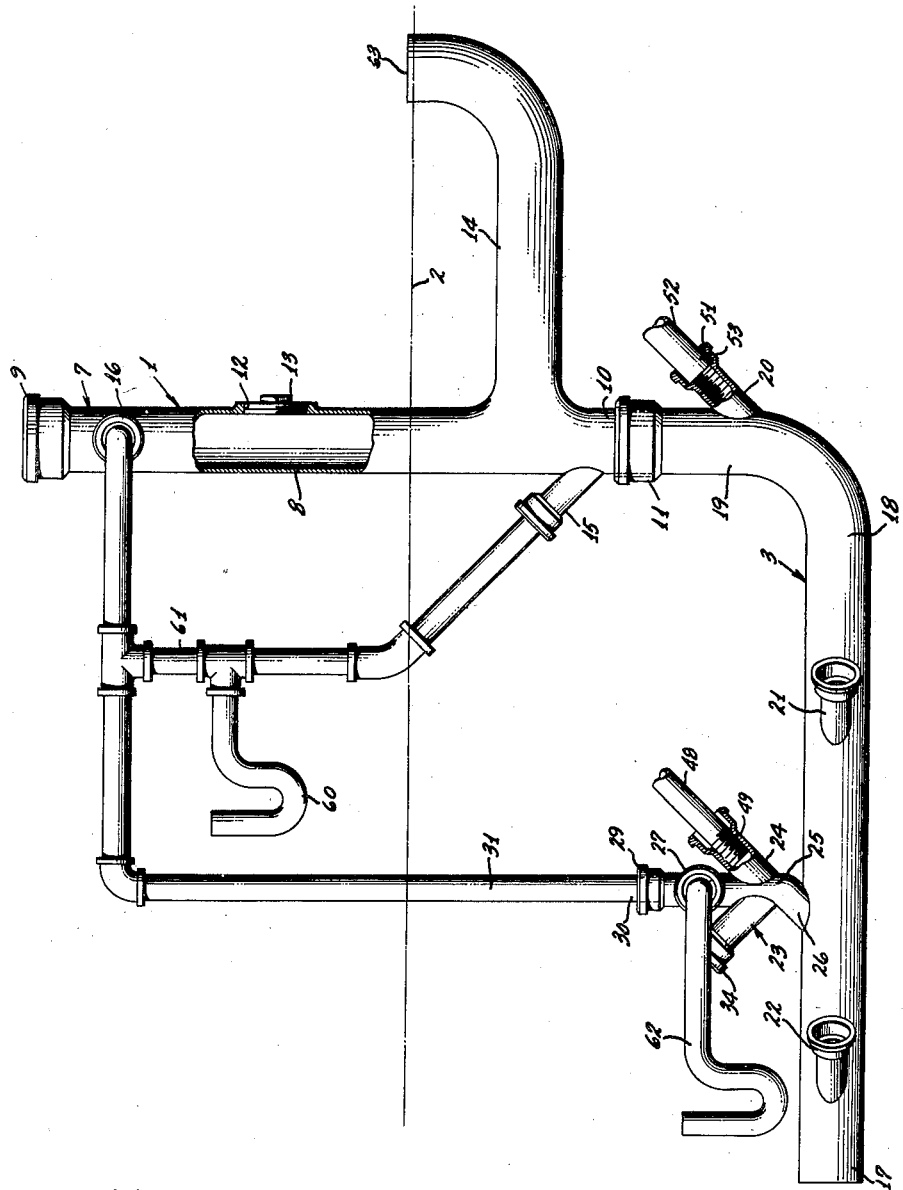
INVENTOR:
JOSEPH W. BOULDIN
BY
ATTORNEY March 7, 1950  J. W. BOULDIN  2,499,900
UNIVERSAL PLUMBING FITTING Filed April 1, 1947  2 Sheets-Sheet 2

INVENTOR:
JOSEPH W. BOULDIN
BY
ATTORNEY.

Patented Mar. 7, 1950

2,499,900

UNITED STATES PATENT OFFICE 2,499,900

UNIVERSAL PLUMBING FITTING

Joseph W. Bouldin, Los Angeles, Calif.

Application April 1, 1947, Serial No. 738,683

1 Claim. (Cl. 4—211)

The invention relates to a universal plumbing fitting and has for an object to save time required to caulk and connect a number of waste pipes and vent pipes as is at present required when installing the plumbing in a dwelling.

According to prior plumbing practice, the waste and vent fittings are made up in separate units which can be connected together in various fashions to meet the requirements of a given arrangement of rooms or offices and to meet the requirements of certain States for back venting. While these separate units have the advantage of flexibility in that the units can be connected together in many different combinations, it has the economical disadvantage that it takes time to connect up the various units as required.

An object of the present invention is to provide plumbing fittings which reduce the amount of time required to install the plumbing system, while also having the advantage of making it possible to connect waste and vent pipes in various combinations.

According to the present invention, there is provided a main plumbing fitting cast in one piece and corresponding to a number of straight sections and one or more elbows or branches formerly supplied in separate units, and the thing which makes it possible to employ this integral unit as a universal fitting, whether as a horizontal waste or soil pipe, or as a vertical combination vent and waste pipe, with an integral toilet bend on the soil pipe or the waste pipe, is an adapter or coupling which is cast integral with the main body of the fitting. This adapter is provided at various places on opposite sides and along the length of the main body and the risers or branches therefrom. This coupling is in the form of a lateral branch having a bell end or socket in which a pipe may be caulked. Also, this coupling has a reduced intermediate portion having threads so that a waste or vent pipe of smaller diameter may be threaded into it. The bottom of the coupling has a wall which, in fact, is an integral part of the wall of the main fitting. This coupling gives considerable flexibility in the plumbing system, because three choices are possible. In the first place, the bottom wall of the coupling may be left intact in the event that it is not desired to use that particular coupling. If space limitations requires it, the unused coupling may be cut off. In the second place, the screw threads in the coupling are so arranged that a chisel may be inserted in the coupling to break away the wall at the bottom of the coupling and this gives two other possibilities, as either a waste pipe may be caulked in the socket end of the coupling, or a vent pipe of smaller diameter having screw threads may be threaded into the coupling. Hence the piping system is flexible as either a vent pipe or a waste pipe may be connected to the main body of the fitting at any one of a number of locations. This flexibility is obtained while making it unnecessary to caulk a number of different types of main body sections together to meet a particular waste and vent requirement particularly if the toilet bend is cast integral with one of the fittings.

Preferably the special couplings are provided on opposite sides of the horizontal soil or waste pipe and on two or more sides of a vertical branch from the main soil pipe and on the main vent pipe. Preferably the closet bend is cast integral with the main vent pipe although for installations having a concrete floor it may be cast integral with the horizontal soil pipe.

The invention may be used for multi-story buildings by extending only two plain pipes between floors, for the back vent and the combination vent and waste pipe, the universal fitting for the latter being used on upper floors.

Experience indicates that for an average five-room one story house, the special fittings of this invention will save about two days of labor in installing the plumbing.

For further details of the invention, reference may be made to the drawings wherein Fig. 1 is a schematic illustration of a plumbing system having a waste line and a vent pipe each embodying the features of the present invention.

Figure 3:
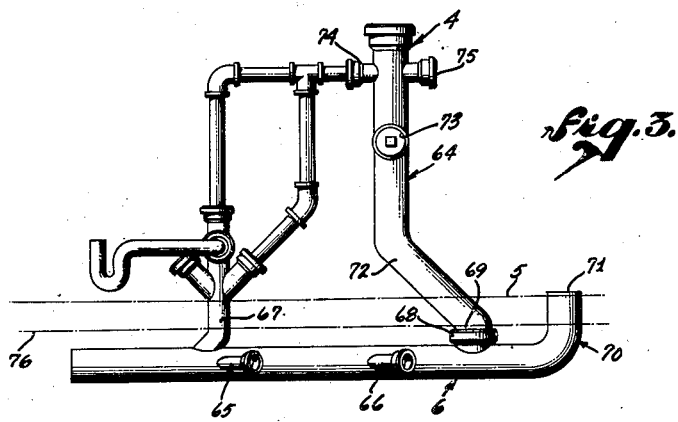
Fig. 3 is a schematic view of a modified form of waste line and vent pipe each having a number of adapters or couplings according to the present invention.

Referring in detail to the drawings, the plumbing system 1 in Fig. 1 is suitable for use in a dwelling or other building where there is a clearance such as about 29 inches below the floor line indicated at 2, with the soil line 3 arranged in a ditch, while the plumbing system 4 in Fig. 3 is suitable for a building having a concrete slab about 4 inches thick below the floor line indicated at 5, with only about 10 inches of clearance from the floor line 5 to the bottom of the waste line 6, so that the waste line 6 is laid practically on top of the ground.

According to the system shown in Fig. 1, the invention provides a vent pipe fitting 7 cast in one integral piece of cast iron and comprising an elongated upright body portion 8 terminating at its upper end in a socket 9 into which another pipe may be caulked, and terminating in its lower end in a spigot 10 to be caulked in the socket 11 on the waste line 3. Also, the one piece cast fitting 7 has a clean-out opening 12 having a closure 13, and an integral toilet bend 14, as well as an adapter or coupling 15 which branches upwardly from the body portion 8 at its lower end thereof opposite the toilet bend 14, and a lateral adapter or coupling 16 and a similar coupling not shown on the opposite side at the top of fitting 7.

Figure 2:
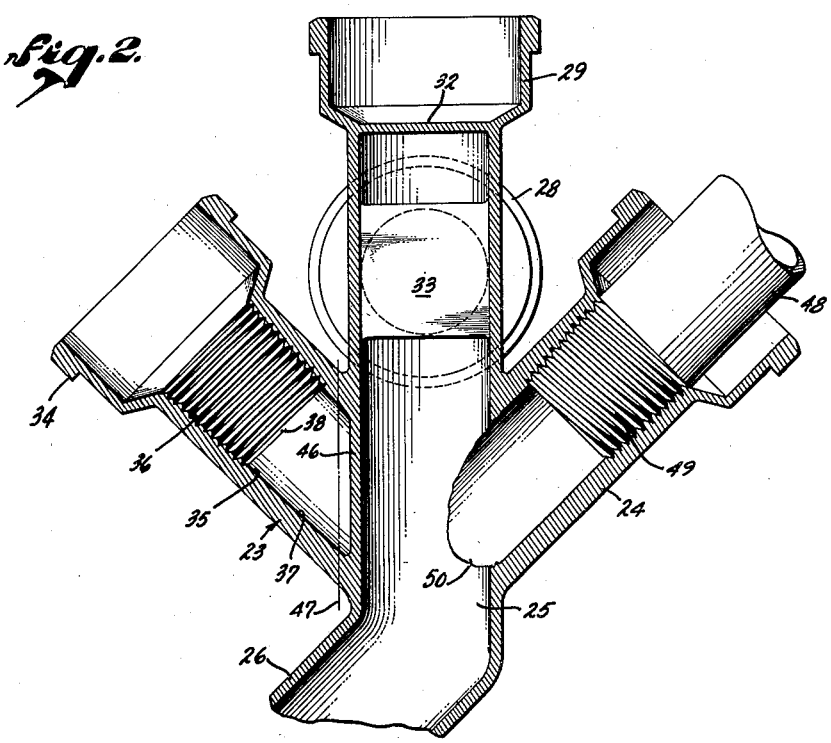
Fig. 2 is an enlarged view of a vertical branch on the waste line of Fig. 1, showing a number of adapters or couplings according to the present invention.

The waste line 3 terminates at its discharge end in a spigot 17 to be caulked into a plain pipe section. The waste line 3 is one integral cast iron fitting and has a main body portion comprising the horizontal portion 18 and an integral upright bend 19. Extending upwardly at an angle to the vertical portion 19 is a coupling or adapter 20 and on the body portion 18 is a branch 21 and a similar branch not shown on the opposite side of the portion 18, as well as a branch 22 and a similar branch not shown on the opposite side of the portion 18. The branches like 21 and 22 are adapters or couplings like 15, 16 and 20, and similar adapters or couplings as indicated at 23 and 24 branch from the riser 25 of an angle branch 26, similar lateral adapters or couplings as indicated at 27, and a similar one on the opposite side of riser 25 as indicated at 28 in Fig. 2, also being provided. The vertical branch 25 terminates at its upper end in a socket 29 to receive the spigot 30 of a back vent 31. Some States do not require a back vent, and for that reason, as shown in Fig. 2, the bottom of socket 29 is cast with a wall 32 which can be left intact to seal off the upper end of the riser 25, or it can be cut with a chisel and broken away in the event that a pipe such as the back vent 31 is to be caulked into the socket 29.

As the couplings 27 and 28 are waste lines and discharge into riser 25 at opposite points, one thereof is prevented from discharging into the other by internal web 33 which shields the discharge of each of the couplings 27 and 28, from the other.

The lateral couplings 27 and 28 are similar to the couplings 23 and 24, except that the former have an axis at right angles to the axis of the riser 25 whereas the latter branch at an angle. Each of the special couplings provided according to the present invention are cast integral with its associated pipe section and are manufactured in the form shown at 23 in Fig. 2, wherein the wall of the branch 25 as indicated at 46 seals off the bottom of the branch 23. Branch 23 has a socket 34 of a certain diameter so that the spigot end of a pipe can be caulked into it, and the branch 23 has an intermediate portion of a smaller diameter between the socket 34 and the bottom 46, as indicated at 35. The portion 35 of intermediate diameter is tapped to provide screw threads 36 for only a portion of its length, leaving an unthreaded portion 37 between the inner end 38 of the screw threads and the bottom 46 of the branch. The various choices initially described are made possible by this construction. If the plumbing requirements of a particular dwelling do not require the use of a particular coupling such as coupling 23, although the same applies, of course, to any of the other special couplings above described, the pipe wall portion 46 which forms the bottom of the coupling 23 is left intact. If coupling 23 is not used or if a coupling like 21 or 22 are not used, with the fitting arranged close to a wall or the like with insufficient room for such unused fitting, it may be removed by cutting with a chisel, outside of wall 46 as indicated by the broken line 47 in Fig. 2, and by giving the coupling a sharp blow to break it off. If a particular coupling like 23 is used, a chisel is inserted into the coupling to cut around the periphery of the bottom 46 whereby it may be broken out and removed. The unthreaded portion 37 permits the insertion of a chisel into cutting relation with the bottom 46 close to the side wall of the coupling, without damaging the threads 36. After the bottom 46 is removed, a pipe as indicated by 48, having threads 49, may be threaded into the coupling, here illustrated as applied to coupling 24 with its bottom wall broken away as indicated at 50. Or if the requirement is for a pipe of a larger diameter, such pipe may be caulked into the socket end of the coupling as indicated in Fig. 1 wherein the spigot end 51 of a pipe 52 is caulked into the socket 53.

From Fig. 1, it is apparent that the vent 7 with its integral toilet bend 14 requires only one caulk, at socket 11, to the waste line 3. In the example shown, the trap 60 from a wash basin is piped into the coupling 15 with either a caulk connection like that shown at 51, or a screw thread connection like that shown at 49. The wash basin line 60 has a back vent connection 61 to the back vent 31 connected at its upper end by either caulk or screw thread to the coupling 16. The pipe 52 may, for example, handle the waste from a kitchen sink and coupling 21 or 22 or a similar one on the opposite side of a main body 18 may be connected to a laundry tray not shown. Also, in the example shown, coupling 23 is not used, while pipe 48 may receive waste from a bath tub or shower or pipe 62 may receive waste from a wash tub or the like. Additional plumbing, either on the same side of vent 7 or at any point around it, may be handled by couplings like 21 and 22 also 16 and a similar one behind it. Also, the fittings 3 and 7 in Fig. 1 may be used for multi-story buildings, by caulking a required number of plain pipe sections above socket 9 and by caulking another vent fitting like 7 at the proper level to that line, and by extending the back vent 31 up to the required floor.

For buildings having greater plumbing requirements, additional branches like 26 and additional couplings like 20, 21, 22 may be provided at various positions and angles with respect to the waste line 3. Also, additional couplings like 15 and 16 may be provided at other locations and angles on the vent 7. However, the couplings shown in Fig. 1 are sufficient for the average five or six room, one-story dwelling.

By way of example, the hubs such as 29 and 34 in Fig. 2 may be 3 inches in diameter, the threaded portion like 36 may have a length of an inch and a half and a diameter of 2 inches, and the diameter of the vent 7, toilet bend 14 and vent 3 may be 4 inches, and the soil pipe like 52 may be 2¾ inches in diameter with a 13 inch rise from the bottom of spigot 10 to the top 63 of the toilet bend 14. Other dimensions may be used.

In the system shown in Fig. 3, the invention provides a one piece cast iron waste line 6 and a one piece cast iron vent 64. The waste line 6 has cast integral therewith a number of branches 65, 66 and similar ones on the opposite side of the waste line, like the branches 21, 22 in Fig. 2, as well as a vertical double Y branch 67 like the branch 26 shown in Fig. 2. Also, the waste line 6 has a short vertical hub 68 which terminates below the concrete slab 76, for the spigot 69 of the vent 64. Also, waste line 6 has cast integral therewith the toilet bend 70. The required distance of the spigot opening 71 on the toilet bend 70 from the vent 64 is obtained by casting the lower end of vent 64 with an angular offset as indicated at 72. The vent 64 is cast with an integral clean-out opening 73 and with a plurality of couplings 74, 75 extending from opposite sides of its upper end. All of the couplings indicated at the upper portion of the double Y branch 67 and the branch couplings 65, 66, 74, and 75 are all similar to the special adapters and couplings previously described.

Fig. 3 is similar to Fig. 2 in obtaining flexibility through the use of special couplings or adapters and also the use of requiring only a single caulk, between spigot 69 and hub 68 in Fig. 3, to obtain the vent pipe, waste line and toilet bend connected. By the use of the various special couplings shown in Fig. 3, various arrangements of vent and waste pipes may be connected to the vent pipe 64 and the waste line 6 as required.

In addition to the modifications above described, various other modifications may be made in the invention without departing from the spirit of the following claim. For example, while the couplings like 15 and 20 to 24 are indicated as extending at an angle of 45 degrees, various other angles may be used.

I claim:

A pipe fitting having a body portion having an integral cylindrical wall concentric with the axis of the pipe, a branch coupling casting integral with said body portion, a portion of said concentric wall removably sealing the inner end of said coupling from said body portion.

JOSEPH W. BOULDIN.

REFERENCES CITED

The following references are of record in the file of this patent:

UNITED STATES PATENTS

| Number | Name | Date |
|---|---|---|
| 927,035 | Fruin | July 6, 1909 |
| 1,004,917 | Shadall | Oct. 3, 1911 |
| 1,282,561 | Foley | Oct. 22, 1918 |
| 1,389,608 | Trueman | Sept. 6, 1921 |
| 1,701,691 | Mueller et al. | Feb. 12, 1929 |

FOREIGN PATENTS

| Number | Country | Date |
|---|---|---|
| 21,131 | Great Britain | of 1912 |